United States Patent
Kimura et al.

[11] Patent Number: 5,893,579
[45] Date of Patent: Apr. 13, 1999

[54] SEAT MOUNTED AIR BAG SYSTEM

[75] Inventors: Takao Kimura; Hidetsugu Okazaki; Hidetoshi Utsumi, all of Wako, Japan

[73] Assignee: Honda Giken Kogo Kabushiki Kaisha, Tokyo, Japan

[21] Appl. No.: 08/868,892

[22] Filed: Jun. 4, 1997

[30] Foreign Application Priority Data

Jun. 4, 1996 [JP] Japan ................................. 8-141795
Jun. 4, 1996 [JP] Japan ................................. 8-141796

[51] Int. Cl.$^6$ ............................. B60R 21/20; B60R 21/22
[52] U.S. Cl. .................... 280/730.2; 280/728.3; 297/216.13
[58] Field of Search ................. 280/730.2, 730.1, 280/728.3, 728.2, 728.1; 297/216.13

[56] References Cited

U.S. PATENT DOCUMENTS

| | | | |
|---|---|---|---|
| 5,498,030 | 3/1996 | Hill et al. | 280/730.2 |
| 5,533,750 | 7/1996 | Karlow et al. | 280/730.2 |
| 5,553,887 | 9/1996 | Karlow et al. | 280/730.2 |
| 5,564,739 | 10/1996 | Davidson | 280/730.2 |
| 5,639,111 | 6/1997 | Spencer et al. | 280/730.2 |
| 5,651,582 | 7/1997 | Nakano | 280/730.2 |
| 5,690,354 | 11/1997 | Logan et al. | 280/730.2 |
| 5,749,597 | 5/1998 | Saderholm et al. | 280/730.2 |
| 5,762,363 | 6/1998 | Brown et al. | 280/730.2 |

FOREIGN PATENT DOCUMENTS 6-64491  3/1994  Japan.

*Primary Examiner*—Peter C. English
*Attorney, Agent, or Firm*—Armstrong, Westerman, Hattori, McLeland & Naughton

[57] ABSTRACT

A sewing section for integrally sewing three members (a front cover member 23 covering a front surface of a seat back, a side cover member 24 covering a side of the seat back, and a ball edge 27 clamped between both the cover members 23 and 24) is comprised of a final sewing portion $26_2$ for integrally sewing the front and side cover members 23 and 24 and the ball edge 27 at a location nearer a body portion $27_1$ of the ball edge 27, and a temporary sewing portion $26_1$ for integrally sewing the front cover member 23 and the ball edge 27 at a location farther from the body portion $27_1$ of the ball edge 27. When an air bag is expanded, the final sewing portion $26_2$ is broken, and the ball edge 27 is separated from the side cover member 24 and moved in unison with the front cover member 23. Thus, when the air bag used upon side collision of a vehicle and mounted within a seat is deployed, the ball edge in the sewing section 26 is prevented from interfering with the air bag.

13 Claims, 7 Drawing Sheets

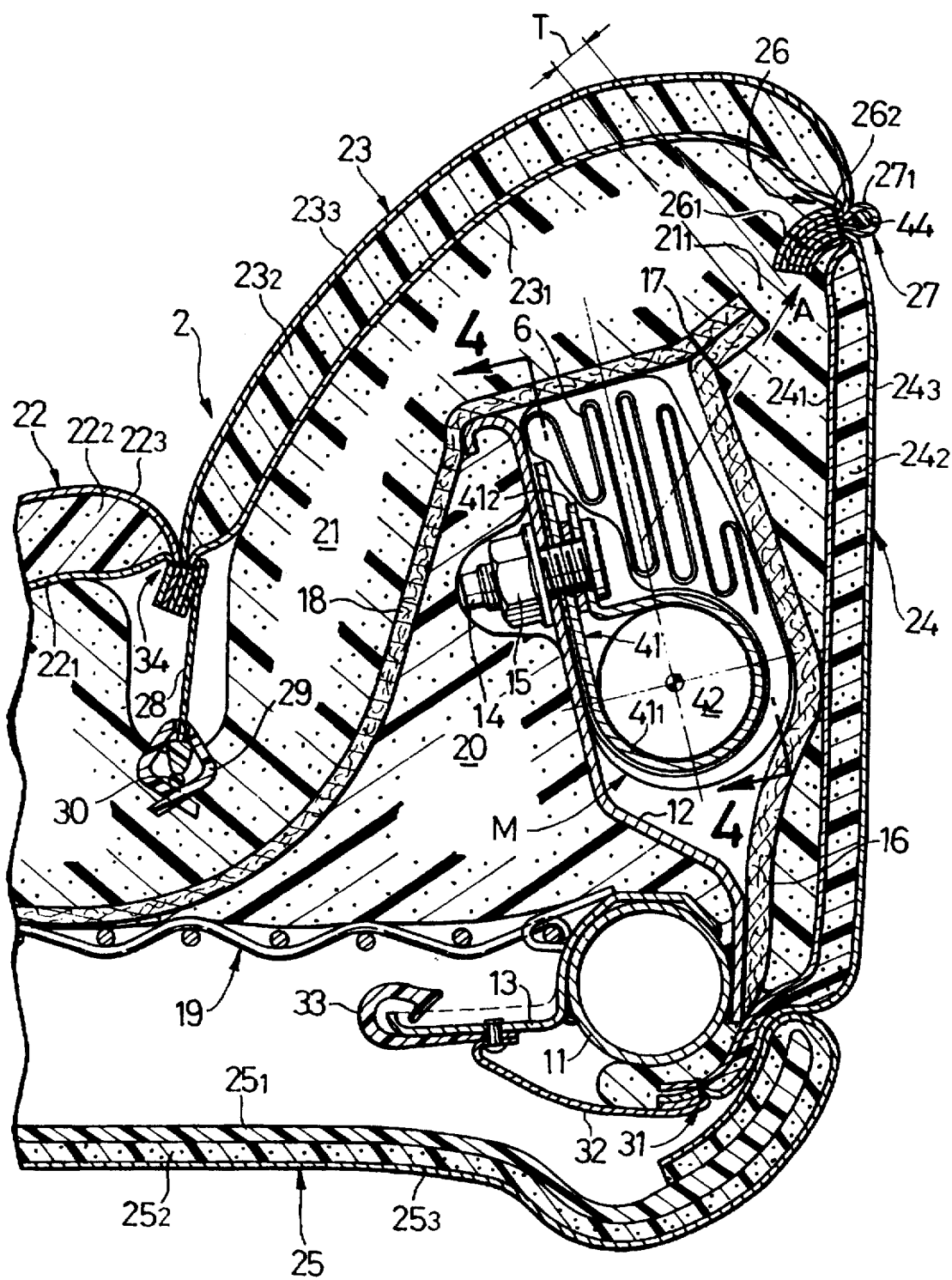

SEAT MOUNTED AIR BAG SYSTEM

BACKGROUND OF THE INVENTION

1. Field of the Invention

The present invention relates to an occupant protecting system for protecting an occupant by deploying an air bag from an air bag module disposed within a seat back.

2. Description of the Related Art

An occupant protecting system for use upon side collision of a vehicle is known from Japanese Patent Application Laid-open No.6-64491. In the above known system, an air bag module is mounted within a side door or within a seat, so that an air bag is deployed between an occupant and the side door upon side collision of a vehicle to protect the occupant.

When the air bag is mounted within the seat, the expanded air bag is deployed outside, breaking a sewing section of a cover member of the seat. When the sewing section has such a structure that an ornamental ball edge is clamped between a pair of cover members, if the pair of cover members and the ball edge are separated from one another, the ball edge is left to bridge an air bag deployment opening defined between the pair of separated cover members, thereby providing a possibility that the air bag may interfere with the ball edge, so that the smooth deployment of the air bag may be hindered.

The air bag expanded from the air bag module mounted within the seat is deployed outside, breaking the cover member of the seat. For this reason, if the strength distribution of the seat including the cover members is not set appropriately, it is difficult to deploy the air bag in a desired direction.

SUMMARY OF THE INVENTION

Accordingly, it is a first object of the present invention to prevent the interference of the air bag with the ball edge of the sewing section, when the air bag is deployed, breaking the sewing section of the seat back. It is a second object of the present invention to reliably break a predetermined point of the sewing section of the seat in order to deploy the air bag into a correct location within a vehicle compartment from the air bag module mounted within the seat.

According to a first embodiment of the present invention, there is provided an occupant protecting system comprising an air bag module disposed within a seat back, so that a sewing section for integrally sewing three members (a front cover member covering a front surface of the seat back, a side cover member covering a side of the seat back and a ball edge clamped between the front and side cover members), is broken by pressure of the air bag expanded from the air bag module, and the air bag is deployed into a vehicle compartment through an opening defined in the broken portion, the sewing section being comprised of a final sewing portion for integrally sewing the front and side cover members and the ball edge at a location nearer the body portion of the ball edge, and a temporary sewing portion for integrally sewing the front cover member and the ball edge at a location farther from the body portion of the ball edge.

With the above construction, when the sewing section is broken, the ball edge is separated from the side cover member. The ball edge is moved from the opening for development of the air bag as it has been coupled to the front cover member, and the air bag is thus deployed smoothly without interfering with the ball edge. Moreover, since the front and side cover members and the ball edge are finally sewn to one another at the location nearer the body portion of the ball edge, the ball edge has a good appearance.

In addition, according to a second embodiment of the present invention, there is provided an occupant protecting system comprising an air bag module disposed within a seat back, so that a sewing section for integrally sewing three members (a front cover member covering a front surface of the seat back, a side cover member covering a side of the seat back and a ball edge clamped between the front and side cover members), is broken by pressure of the air bag expanded from the air bag module, and the air bag is deployed into a vehicle compartment through an opening defined in the broken portion. The sewing section includes a final sewing portion for integrally sewing the front and side cover members and the ball edge at a location nearer the body portion of the ball edge, and a temporary sewing portion for integrally sewing the side cover member and the ball edge at a location farther from the body portion of the ball edge.

With the above construction, when the sewing section is broken, the ball edge is separated from the front cover member. The ball edge is removed from the opening for development of the air bag as it has been coupled to the side cover member, and the air bag is thus deployed smoothly without interfering with the ball edge. Moreover, since the front and side cover members and the ball edge are finally sewn to one another at the location nearer the body portion of the ball edge, the ball edge has good appearance.

According to a third embodiment of the present invention, there is provided an occupant protecting system comprising an air bag module disposed within a seat back, so that a sewing section for a cover member covering a front surface of the seat back and a cover member covering a side of the seat back is broken by pressure of the air bag expanded from the air bag module, and the air bag is deployed into a vehicle compartment through an opening defined in the broken portion, one side of the air bag accommodated in the air bag module being covered with a rigid wall, and the other side of the air bag opposite from the rigid wall being opposed to the sewing section.

With the above construction, the air bag can be expanded toward the sewing section by a reaction force received from the rigid wall, and the sewing section can be reliably broken by pressure of such an expansion.

In addition, a fourth embodiment of the present invention is directed to an occupant protecting system comprising an air bag module disposed within a seat back, so that a sewing section for a cover member covering a front surface of the seat back and a cover member covering a side of the seat back is broken by a pressure of the air bag expanded from the air bag module, and the air bag is deployed into a vehicle compartment through an opening defined in the broken portion, the system further including a side shape-retaining member disposed between a relatively thin cover member covering the side of the seat back and the air bag module, and a front shape-retaining member disposed between a relatively thick cover member covering the front surface of the seat back and the air bag module, the rigidity of the side shape-retaining member being set higher than the rigidity of the front shape-retaining member.

With the above construction, it is possible to prevent the thin cover member from being broken by the pressure of expansion of the air bag while reliably assuring the break of the sewing section.

In addition, according to a fifth embodiment of the present invention, there is provided an occupant protecting system comprising an air bag module disposed within a seat back, so that a sewing section for a cover member covering a front surface of the seat back and a cover member covering a side of the seat back is broken by pressure of the air bag expanded from the air bag module, and the air bag is deployed into a vehicle compartment through an opening defined in the broken portion, the system further including a pad disposed between both the cover members and the air bag module, the pad including a thin portion at a location opposed to the sewing section.

With the above feature, the thin portion is easily broken by the pressure of expansion of the air bag. Thus, it is possible to transmit the expansion pressure directly to the sewing section to reliably break the sewing section.

Further, according to a sixth embodiment of the present invention, there is provided an occupant protecting system comprising an air bag module disposed within a seat back, so that a sewing section for a cover member covering a front surface of the seat back and a cover member covering a side of the seat back is broken by a pressure of the air bag expanded from the air bag module, and the air bag is deployed into a vehicle compartment through an opening defined in the broken portion, a tip end of the air bag thus expanded being formed long in a direction parallel to the sewing section.

With the above feature, it is possible to effectively transmit the pressure of expansion of the air bag to the sewing section to reliably break the sewing section.

The above and other objects, features and advantages of the invention will become apparent from the following description of the accompanying drawings.

BRIEF DESCRIPTION OF THE DRAWINGS

FIGS. 1 to 5 illustrate a first example of the present invention, wherein

FIG. 1 is a side view of a seat equipped with an air bag device;

FIG. 2 is a view taken along an arrow 2 in FIG. 1;

FIG. 3 is an enlarged sectional view taken along a line 3—3 in FIG. 1;

FIG. 5 is a view for explaining the operation during development of an air bag.

DETAILED DESCRIPTION OF THE PREFERRED EMBODIMENTS

The present invention will now be described by way of examples with reference to the accompanying drawings.

A first example of the present invention will be first described with reference to FIGS. 1 to 5.

Figure 1:
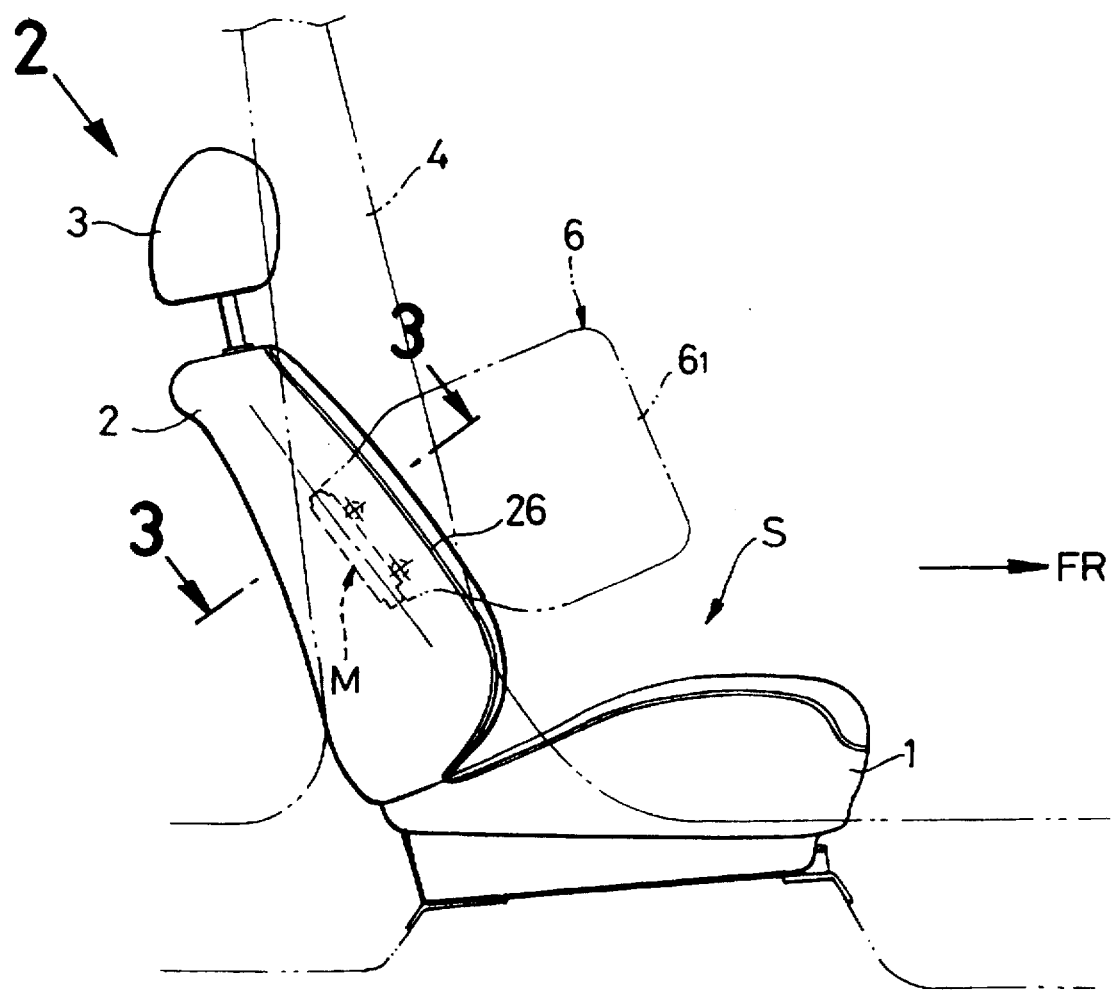
Figure 2:
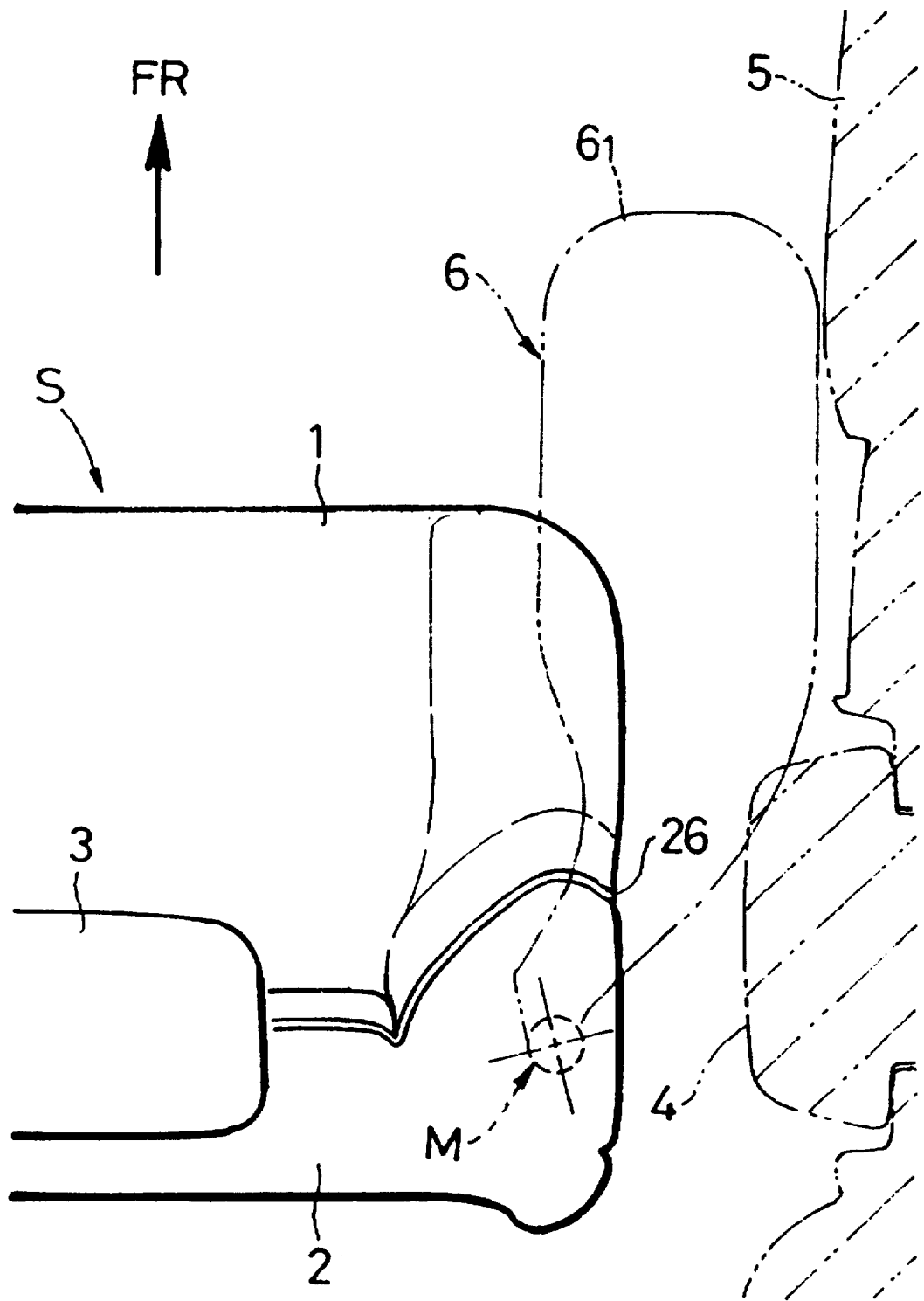

As shown in FIGS. 1 to 2, a front seat S in an automobile vehicle is comprised of a seat cushion 1 disposed substantially horizontally, a seat back 2 extending rearwards and upwards from a rear end of the seat cushion 1, and a head rest 3 mounted on an upper end of the seat back 2. A center pillar 4 faces a right side of the seat back 2, and a front door 5 is disposed at a front portion of the center pillar 4. An air bag module M is accommodated within a right portion of the seat back 2. When the air bag module M is operated, an air bag 6 breaks and forces open a sewing section of the seat back 2, so that it is deployed obliquely forwards to intervene between a right side of an occupant seated on the seat S and left sides of the center pillar 4 and the front door 5.

As can be seen from a cross section of the seat back 2 shown in FIG. 3, an air bag module mounting bracket 12 made of a metal and extending towards the front of a vehicle body and a retainer 13 made of a metal and extending into the vehicle body are fixed by welding to a pipe frame 11 extending vertically along a right edge of the seat back 2. The air bag module M is fixed to a right side of the air bag module mounting bracket 12 by two bolts 14, 14 and two nuts 15, 15. A section from a right side of the pipe frame 11 to a right side of the air bag module M is covered with a side shape-retaining member 16 formed of a pressed felt. A front shape-retaining member 18 formed of a coarse blanket sewn at a sewing section 17 to a front end of the side shape-retaining member 16 extends leftwards of the vehicle body through a widthwise intermediate portion of the seat back 2 to cover a front surface of the air bag module M, and is connected to a pipe frame (not shown) located on a left side of the vehicle body. The side shape-retaining member 16 formed of the pressed felt is relatively hard, and the front shape-retaining member 18 formed of the coarse blanket is softer than the pressed felt. As shown in FIG. 3, the side shape-retaining member 16, the front shape-retaining member 18 and the air bag module mounting bracket 12 form a cavity in which the air bag module M is located.

A mesh-like spring 19 is laid around an inner periphery of the pipe frame 11, and a pad 20 formed of a sponge is mounted in a section surrounded by a section surface of the front shape-retaining member 18 and a section surface of the air bag module mounting bracket 12. A pad 21 also formed of a sponge is mounted on front surfaces of the side shape-retaining member 16 and the front shape-retaining member 18.

A central portion of a front surface of the seat back 2 is covered with a first cover member 22, and left and right opposite sides and an upper portion of the first cover member 22 are covered with a second cover member 23. Further, left and right opposite sides and an upper surface of the seat back 2 connected to the second cover member 23 are covered with a third cover member 24. A section surface of the seat back 2 is covered with a fourth cover member 25 which is formed from a resin plate $25_1$ whose surface is coated with a wadding $25_2$ formed of a sponge and a skin $25_3$ formed of a leather or fabric.

The first, second and third cover members 22, 23 and 24 have the substantially same structure, and are each comprised of a wadding cover $22_1$, $23_1$, $24_1$ abutting against the pad 21, a wadding $22_2$, $23_2$, $24_2$ formed of a thin sponge and integrally coupled to a front surface of the wadding cover $22_1$, $23_1$, $24_1$, and a skin $22_3$, $23_3$, $24_3$ formed of a leather or a fabric and superposed on a front surface of the wadding $22_2$, $23_2$, $24_2$, respectively. The first and second cover member 22 and 23 are sewn to each other at a sewing section 34. The second and third cover members 23 and 24 are sewn to each other at a sewing section 26. The second cover member 23 is relatively thicker than the third cover member 24.

At this time, a ball edge 27 with an outer periphery of a core 44 made of a synthetic resin being covered with a skin formed of a leather or a fabric is integrally sewn to the sewing section 26. The ball edge 27 is comprised of a main body $27_1$ covering the core 44 and a leg $27_2$ extending from the main body $27_1$.

A clip 29 is mounted at a tip end of a tongue piece 28 extending from the sewing section 34, so that the first and second cover members 22 and 23 are retained in a predetermined shape by locking the clip 29 to an anchor 30 embedded in the pad 21. A clip 33 is also mounted at a tip end of a tongue piece 32 extending from the sewing section 31 at a section end of the third cover member 24, so that the third cover member 24 is fixed by locking the clip 33 to the retainer 13.

The structure of the air bag module will be further described below. A holder 41 includes a body portion $4_1$, having a J-shaped section, and a clamp portion $41_2$ extending from one side edge of the body portion 41,. A substantially cylindrical inflator 42 filled with a propellant is fitted into a circular-section defined by the body portion $41_1$, and the clamp portion $41_2$. The holder 41 and the inflator 42 are packed in a base end of the air bag 6 which is in a folded state.

A tip end $6_1$ of the deployed air bag 6 is formed into a longer vertical dimension and a smaller lateral dimension (see FIGS. 1 and 2). The lengthwise direction (vertical direction) of the tip end $6_1$ is substantially parallel to the sewing section 17 of the side and front shape-retaining members 16 and 18 and to the sewing section 26 of the second and third cover members 23 and 24. The pad 21 mounted between the sewing section 17 of the side and front shape-retaining members 16 and 18 and the sewing section 26 of the second and third cover members 23 and 24 has a thin portion $21_1$ formed thereon and has a thickness T smaller than the thickness of a peripheral portion.

The folded air bag 6 has a left side and section surface opposed to the body portion $41_1$ and the clamp portion $41_2$ of the holder 41 forming a rigid wall, respectively, a right side opposed to the side shape-retaining member 16, and a front surface opposed to the front shape-retaining member 18. The holder 41, to which the left side and rear surface of the air bag 6 are opposed, is a rigid member made of a metal, while each of the side and front shape-retaining members 16 and 18, to which the right side and front surface of the air bag 6 are opposed, is a flexible member and moreover, is sewn to each other at the sewing section 17. Therefore, the air bag 6 is deployed obliquely rightwards and forwards toward the sewing section 17 (of the side and front shape-retaining members 16 and 18) and the sewing section 26 (of the second and third cover members 23 and 24) (see arrow A in FIG .3).

Figure 4A:
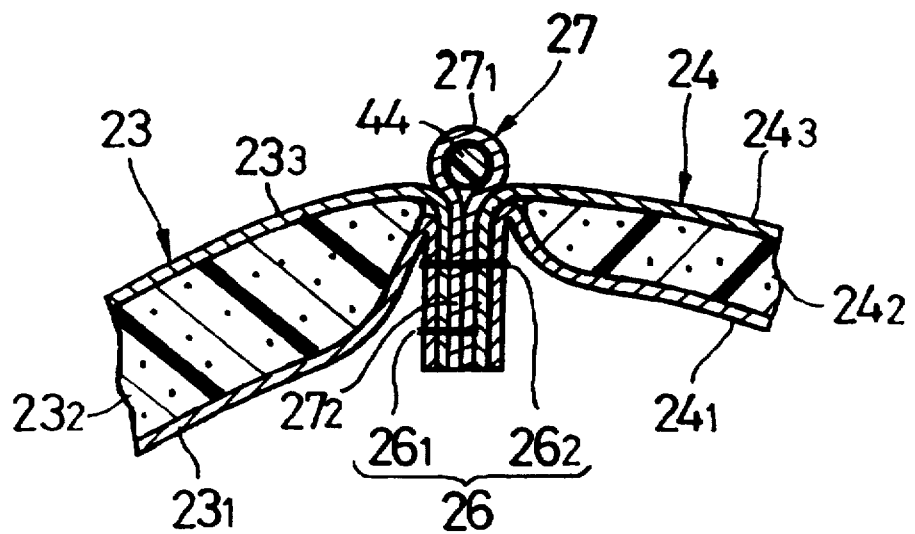
FIGS. 4A and 4B are views for explaining how a ball edge is sewn.
Figure 4B:
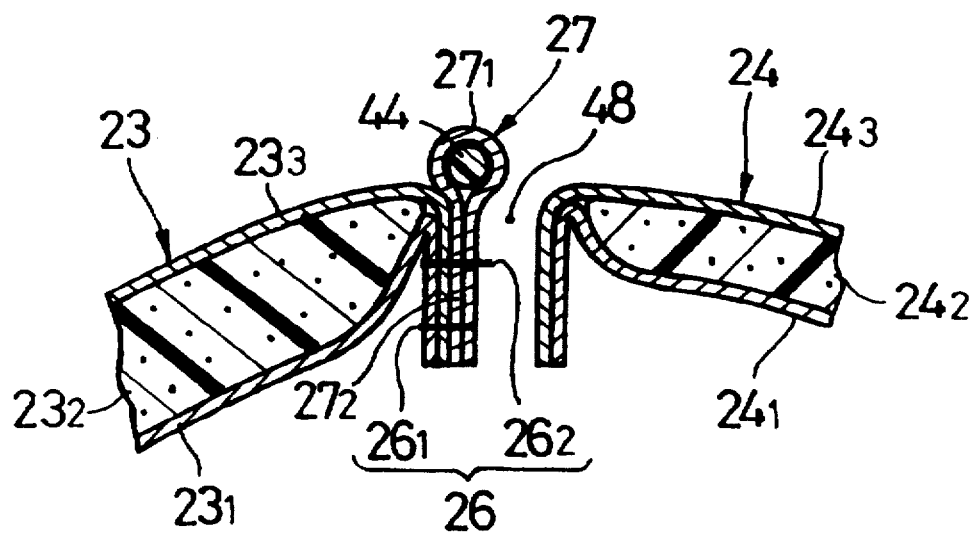

As shown in FIG. 4A, the sewing section 26 for integrally sewing the second cover member 23, the third cover member 24 and the leg $27_2$ of the ball edge 27 includes a temporary sewing portion $26_1$ farther from the body portion $27_1$ of the ball edge 27, and a final sewing portion $26_2$ nearer the body portion $27_1$ of the ball edge 27. The temporary sewing portion $26_1$ integrally sews the wadding cover $23_1$ and the skin $23_3$ of the second cover member 23 and the leg $27_2$ of the double-formed ball edge 27. The final sewing portion $26_2$ integrally sews the wadding cover $23_1$ and the skin $23_3$ of the second cover member 23, the leg $27_2$ of the double-formed ball edge 27 and the wadding cover $24_1$ and the skin $24_3$ of the third cover member 24. Thus, it is possible to prevent a reduction in appearance quality of the seat S by defining a portion of the sewing section 26 nearer the body portion $27_1$ of the ball edge 27 as the final sewing portion $26_2$.

The operation of the embodiment of the present invention having the above-described construction will be described below.

The leftward and rearward expansion of the air bag 6 expanded with a gas generated by the inflator 42 upon collision of the vehicle is restrained by the holder 41 and hence, the air bag 6 is expanded in a direction away from the holder 41, i.e., obliquely rightwards and forwards. As a result, the sewing section 17 of the side and front shape-retaining members 16 and 18, the thin portion $21_1$ of the pad 21 and the sewing section 26 of the second and third cover members 23 and 24 are broken, and the air bag 6 is deployed through openings defined in the broken portions.

At this time, the expansion force of the air bag 6 can be concentrated at the sewing sections 17 and 26 to reliably break them, because the thin portion $21_1$ of the pad 21 having a low rigidity and adapted to be easily broken is located between both sewing sections 17 and 26. In addition, the tip end $6_1$ of the air bag 6 has a shape longer in a vertical direction and shorter in a lateral direction and for this reason, the lengthwise direction of the tip end $6_1$ is substantially parallel to the direction of the sewing sections 17 and 26. Thus, the pressure of the tip end $6_1$ of the expanded air bag can be effectively transmitted to the sewing sections 17 and 26 to reliably break the sewing sections 17 and 26.

The thickness of the pad 21 is relatively small outside the side shape-retaining member 16, and relatively large outside the front shape-retaining member 18. Therefore, if there were no difference between the rigidity of the side shape-retaining member 16 and the rigidity of the front shape-retaining member 18, the side shape-retaining member 16 adjoined by the smaller-thickness portion of the pad 21 would be easily broken. As a result, the expansion force of the air bag 6 would be applied in the direction of the third cover member 24, whereby the third cover member 24 would be broken before the sewing section 17, and the thin portion $21_1$ and the sewing section 26 would be broken, so that the air bag 6 could not be developed obliquely rightwards and forwards.

However, according to a preferred embodiment of the present invention, the side shape-retaining member 16 adjoined by the smaller-thickness portion of the pad 21 is formed of the pressed felt having relatively high rigidity, and the front shape-retaining member 18 adjoined by the larger-thickness portion of the pad 21 is formed of the coarse blanket having relatively low rigidity. Therefore, the flexed amounts of the side and front shape-retaining members 16 and 18 can be substantially equalized to each other, and the expansion force of the air bag 6 can be correctly directed to the sewing section 17, the thin portion $21_1$ and the sewing section 26.

In addition, if both of the second and third cover members 23 and 24 are separated from ball edge 27 when the sewing section 26 is broken by the expansion of the air bag 6, the air bag 6 deployed through the opening 48 defined between the second and third cover member 23 and 24 would be blocked by the ball edge 27 as the ball edge 27 would remain within the opening 48. Therefore, the air bag 6 would not be smoothly deployed.

However, as shown in FIG. 4A, the second cover member 23 and the ball edge 27 are doubly sewn to each other by the temporary sewing portion $26_1$, and the final sewing portion $26_2$, while the third cover member 24 and the ball edge 27 are sewn to each other only by the final sewing portion $26_2$. Therefore, when the pressure of the air bag 6 is applied, the final sewing portion $26_2$ is broken between the third cover member 24 and the ball edge 27, which are sewn together at a weak sewing strength by the final sewing portion $26_2$. As a result, the ball edge 27 is separated from the third cover member 24 and moved in unison with the second cover member 23 and hence, the ball edge 27 does not remain in the opening 48 defined between the second and third cover members 23 and 24, thereby ensuring the smooth development of the air bag 6.

Although the embodiment of the present invention has been described in detail, it will be understood that the present invention is not limited to the above-described embodiment, and various modifications in design may be made without departing from the spirit and scope of the invention defined in claims.

Figure 4C:
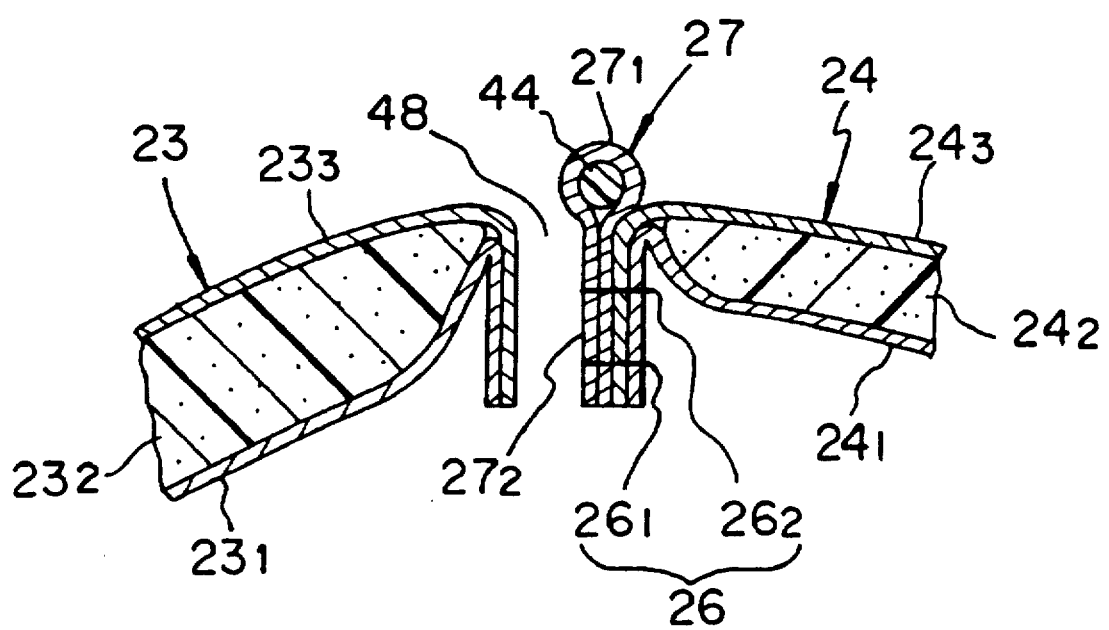
FIG. 4C is a view for explaining how a ball edge is sewn, in a manner modified from that shown in FIG. 4B
Figure 5:
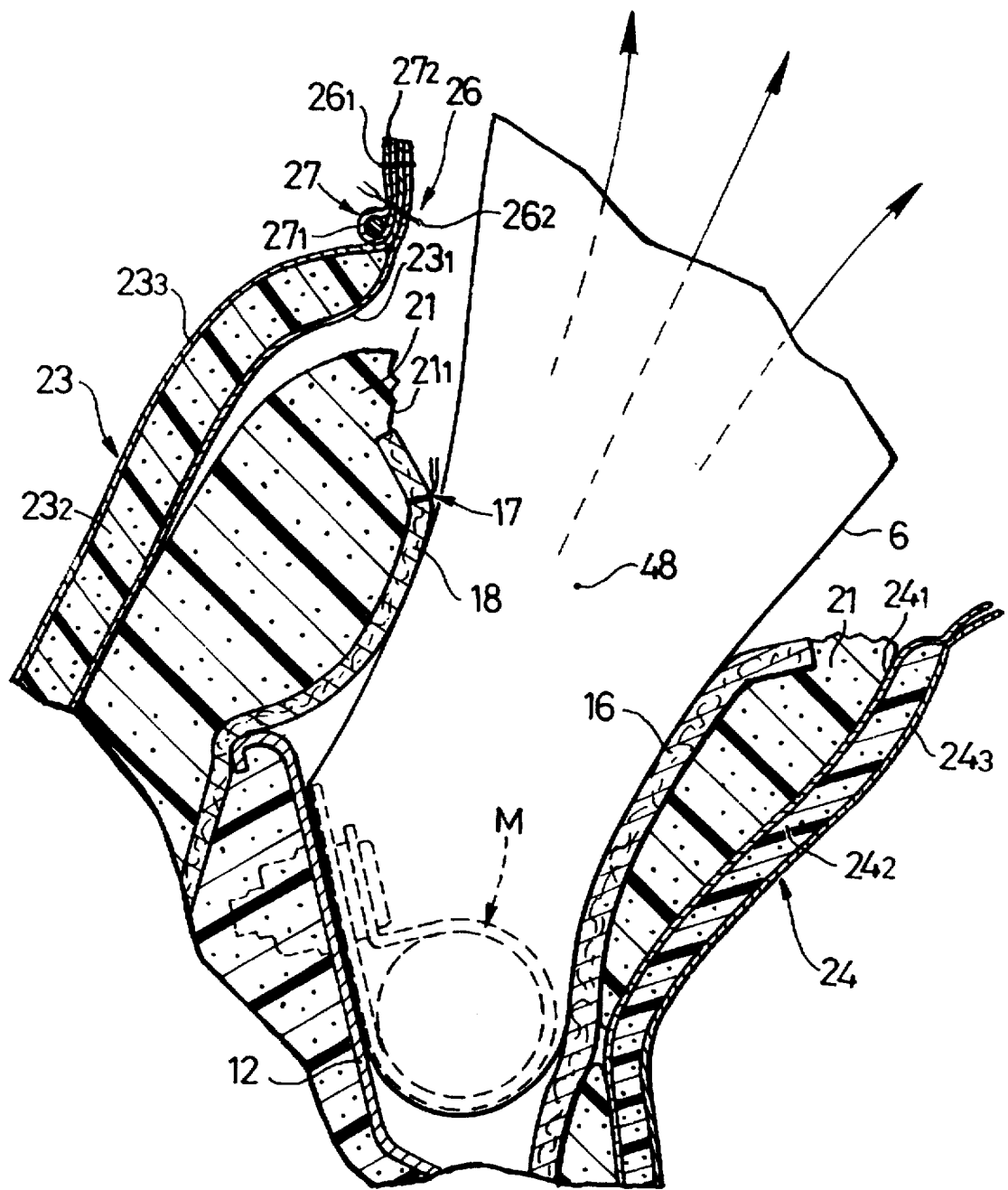

For example, in the embodiment, when the sewing section 26 is broken, the ball edge 27 is permitted to remain on the side of the second cover member 23 by the fact that the second cover member 23 and the ball edge 27 are integrally sewn to each other at the temporary sewing portion $26_1$. Alternatively, the third cover member 24 and the ball edge 27 may be integrally sewn to each other at the temporary sewing section $26_1$, as shown in FIG. 4C, so that the ball edge 27 is permitted to remain on the side of the third cover member 24, when the sewing section 26 is broken. Even in this case, a similar effect can be provided.

Figure 6A:
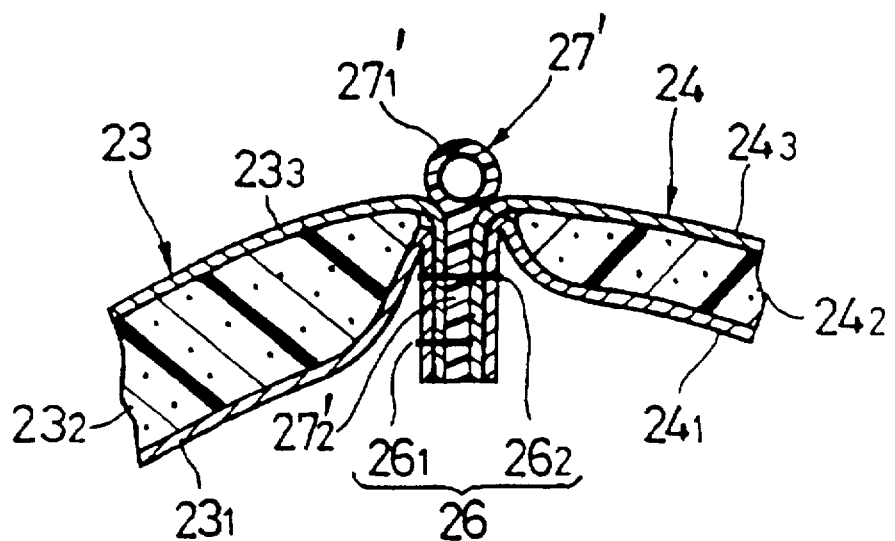
FIG. 6 is a view similar to FIG. 4, but according to a second example of the present invention.
Figure 6B:
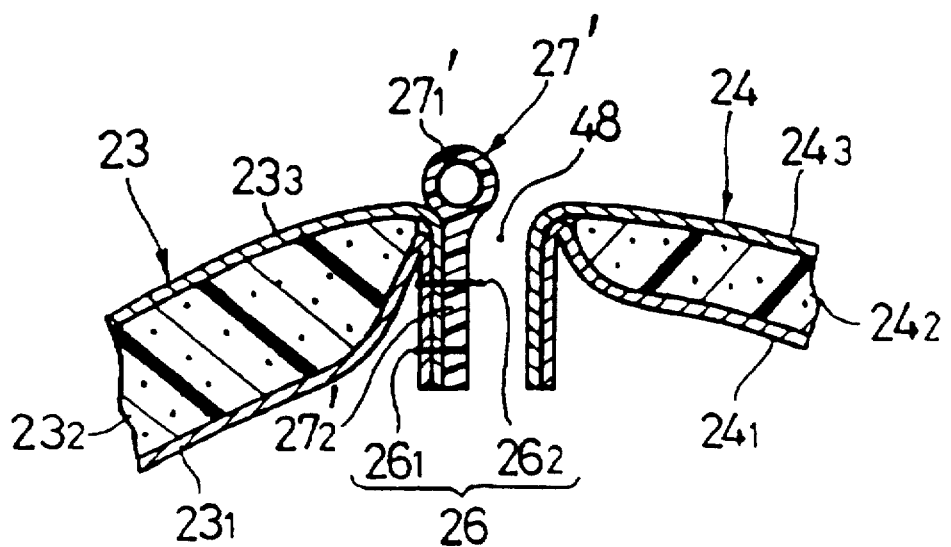

In addition, the ball edge 27 is formed with the core 44 made of the synthetic resin being coated with the skin in the first embodiment, but as in a second embodiment shown in FIG. 6, a ball edge 27' may be formed by integrally forming a hollow pipe-like body portion 27', and a leg $27_2$' connected to the body portion $27_1$' from a synthetic resin. Even if such ball edge 27' is employed, a functional effect similar to that in the first embodiment can be provided.

The materials for the side shape-retaining member 16, the front shape-retaining member 18, the pads 20 and 21, the first to third cover members 22, 23 and 24, the ball edge 27 and the like are not limited to those described above, and any other proper material can be selected.

What is claimed is:

1. An occupant protecting system comprising:
   a seat back;
   a front cover member defining a front surface of said seat back;
   a side cover member defining a side of said seat back;
   a ball edge clamped between said front and side cover members;
   an air bag module disposed within said seat back; and
   a sewing section, including a temporary sewing portion sewing one of said front cover member and said side cover member to said ball edge, and a final sewing portion sewing said front cover member, said side cover member and said ball edge.

2. The occupant protecting system of claim 1, wherein said ball edge includes a body portion located on an exterior side of said seat back and a leg portion located at an interior portion of said seat back; and
   said temporary sewing portion and said final sewing portion are located at said leg portion at first and second positions, respectively, said first portion being further from said body portion than said second portion.

3. The occupant protecting system of claim 2, wherein said temporary sewing portion sews only said front cover member to said ball edge.

4. The occupant protecting system of claim 2, wherein said temporary sewing portion sews only said side cover member to said ball edge.

5. An occupant protecting system comprising:
   a seat back including a cover member and a cavity defined inside said cover member by flexible first and second walls, said flexible first wall being more rigid than said flexible second wall;
   an air bag module including an air bag, located in said cavity within said seat back;
   wherein said first and second walls meet at a breaking location and are separated during deployment of said air bag to thereby allow deployment of said air bag into a vehicle compartment through the separation of the first and second walls.

6. The occupant protecting system of claim 5, wherein said cavity included in said seat back has a relatively inflexible third wall meeting said first and second walls.

7. The occupant protecting system of claim 5, wherein said cover member comprises a first cover member disposed outside said first wall and a second cover member disposed outside said second wall, said first cover member having a thickness smaller than that of said second cover member.

8. The occupant protecting system of claim 7, wherein said seat back further comprises a pad interposed between said cover member and said first and second walls.

9. The occupant protecting system of claim 5, wherein said first and second walls are made of different materials to thereby achieve the differences in rigidity between the first and second walls.

10. An occupant protecting system comprising:
    a seat back including a cavity, a flexible first wall of said cavity being more rigid than a flexible second wall of said cavity;
    an air bag module including an air bag, located in said cavity within said seat back;
    wherein said first and second walls meet at a breaking location and are separated during deployment of said air bag to thereby allow deployment of said air bag into a vehicle compartment through the separation of the first and second walls;
    wherein said seat back includes a side cover member covering a door side of said second wall and said second wall is located nearer to a front of said seat back than said first wall.

11. The occupant protecting system of claim 10, wherein said first wall is made of pressed felt and said second wall is made of a coarse blanket.

12. An occupant protecting system comprising:
    a seat back including a cavity, a flexible first wall of said cavity being more rigid than a flexible second wall of said cavity;
    an air bag module including an air bag, located in said cavity within said seat back;
    wherein said first and second walls meet at a breaking location and are separated during deployment of said air bag to thereby allow deployment of said air bag into a vehicle compartment through the separation of the first and second walls;
    wherein said seat back includes a side cover member covering a door side of said seat back and a front cover member covering a front of said seat back, said side cover member being thinner than said front cover member.

13. The occupant protecting system of claim 12, wherein said seat back includes a pad disposed between said first and second walls of said cavity and said front and side cover members, said pad having a breaking portion located at said breaking location of said first and second walls, said pad at said breaking portion being thinner than said pad at each side of said breaking portion.

* * * * *